US011042911B1

(12) United States Patent
Todd et al.

(10) Patent No.: US 11,042,911 B1
(45) Date of Patent: Jun. 22, 2021

(54) CREATION OF HIGH VALUE DATA ASSETS FROM UNDERVALUED DATA

(71) Applicant: EMC IP Holding Company LLC, Hopkinton, MA (US)

(72) Inventors: Stephen J. Todd, Shrewsbury, MA (US); Anand Singh, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 400 days.

(21) Appl. No.: 15/908,052

(22) Filed: Feb. 28, 2018

(51) Int. Cl.
*G06Q 30/02* (2012.01)

(52) U.S. Cl.
CPC .............................. *G06Q 30/0278* (2013.01)

(58) Field of Classification Search
CPC ... H04L 9/3239; G06F 16/27; G06F 16/2379; G06F 9/543; G06F 9/466; G06F 16/9535; G06F 3/017; G06F 16/29; G06F 16/2219; G06F 16/24578; G06F 16/9024; G06F 17/18; G06F 21/604; G06F 21/62; G06F 21/6227; G06F 21/6245; G06F 2221/2149; G06F 3/0484; G06F 40/205; G06F 16/00; G06F 16/211; G06F 16/212; G06F 16/23; G06F 16/2428; G06F 16/2457; G06F 16/24575; G06F 16/2458; G06F 16/2465; G06F 16/2477; G06F 16/248; G06F 16/254; G06F 16/258; G06F 16/283; G06F 16/288; G06F 16/334; G06F 16/9014; G06F 16/903; G06F 16/906; G06F 16/958; G06F 17/00; G06F 17/15; G06F 17/16; G06F 1/1656; G06F 1/182; G06F 21/16; G06F 21/31; G06F 21/602; G06F 2216/03; G06F 2221/2137; G06F 2221/2141; G06F 30/20; G06F 3/0481; G06F 3/04817; G06F 3/04842; G06F 3/04847; G06F 40/30; G06F 7/5443; G06F 8/10; G06F 8/24; G06F 8/35; G06F 8/38; G06F 9/44505; G06F 9/451;
(Continued)

(56) References Cited

U.S. PATENT DOCUMENTS

| 8,166,048 B2 * | 4/2012 | Wong | G06Q 30/02 707/748 |
| 8,819,010 B2 * | 8/2014 | Fankhauser | G06Q 10/10 707/736 |
| 9,659,042 B2 * | 5/2017 | Puri | G06F 16/35 |

(Continued)

OTHER PUBLICATIONS

Doug Laney, "The Economics of Information Assets," The Center for Infonomics, Smarter Companies presentation, Sep. 2011.
(Continued)

*Primary Examiner* — Peter Ludwig
(74) *Attorney, Agent, or Firm* — Ryan, Mason & Lewis, LLP

(57) ABSTRACT

Techniques are disclosed for creating high value data assets from undervalued data. In one example, a method identifies at least one data asset associated with an enterprise which has a lower non-economic valuation score as compared with one or more other data assets associated with the enterprise and is determined to be undervalued. The method then combines the at least one identified data asset with at least one of the one or more other data assets to form a composite data asset, wherein the composite data asset has a higher non-economic valuation score as compared to the at least one identified data asset.

20 Claims, 9 Drawing Sheets

(58) Field of Classification Search
CPC ....... G06F 16/219; G06F 16/35; G06Q 10/06;
G06Q 10/0635; G06Q 10/0637; G06Q
10/06393; G06Q 30/02; G06Q 50/10;
G06Q 50/188
See application file for complete search history.

(56) References Cited

U.S. PATENT DOCUMENTS

| | | | | |
|---|---|---|---|---|
| 10,061,816 | B2* | 8/2018 | Convertino | G06F 16/248 |
| 2009/0182780 | A1* | 7/2009 | Wong | G06F 16/25 |
| 2011/0153508 | A1* | 6/2011 | Jhunjhunwala | G06Q 40/06 |
| | | | | 705/306 |
| 2011/0270845 | A1* | 11/2011 | Lin | G06F 16/951 |
| | | | | 707/748 |
| 2012/0158678 | A1* | 6/2012 | McGraw | G06Q 30/02 |
| | | | | 707/694 |
| 2013/0297477 | A1* | 11/2013 | Overman | G06Q 40/00 |
| | | | | 705/37 |
| 2015/0058278 | A1* | 2/2015 | Fankhauser | G06F 16/215 |
| | | | | 707/602 |
| 2015/0154706 | A1* | 6/2015 | Wakeman | G06Q 40/06 |
| | | | | 705/36 R |
| 2019/0026358 | A1* | 1/2019 | Li | G06F 16/215 |

OTHER PUBLICATIONS

U.S. Appl. No. 15/381,251, filed in the name of Stephen Todd et al. filed Dec. 16, 2016 and entitled "Economic Valuation of Data Assets."

U.S. Appl. No. 15/484,270, filed in the name of Stephen Todd et al. filed Apr. 11, 2017 and entitled "Data Governance with Automated Risk Valuation via Impact Per Event Analytics."

\* cited by examiner

| Data Element | BVI |
|---|---|
| Customer Address | 16.96 |
| Tax Jurisdiction | 12.30 |
| Customer Install Configuration | 6.02 |
| Employee Training | 0.55 |

| Data Element | BV |
|---|---|
| Customer Address | 0.91 |
| Tax Jurisdiction | 0.4 |
| Customer Install Configuration | 0.3 |
| Employee Training | 0.55 |

CREATION OF HIGH VALUE DATA ASSETS FROM UNDERVALUED DATA

FIELD

The field relates generally to data processing and, more particularly, to valuation of data assets.

BACKGROUND

As enterprises collect more and more electronic data during the course of their data gathering and processing operations, they are recognizing the importance of calculating the value of such data assets, i.e., performing data valuation.

By way of one example, data valuation can be used to compute the business value of different data assets and then take some action based on the computed business value. By way of example, an enterprise can modify the information technology (IT) infrastructure investment made by the enterprise based on the computed business value (e.g., use disaster recovery for higher value data sets).

However, while it is possible to assign some type of (non-economic) business value to data assets, it is more difficult to effectively assign economic (e.g., dollar) value to data assets. As a result, data assets that could result in economic benefits to an enterprise may go unrecognized.

SUMMARY

Embodiments of the invention provide techniques for data valuation of data assets. More particularly, illustrative embodiments provide techniques for identifying undervalued data and creating high value data assets from undervalued data.

For example, in one embodiment, a method comprises the following steps. The method identifies at least one data asset associated with an enterprise which has a lower non-economic valuation score as compared with one or more other data assets associated with the enterprise and is determined to be undervalued. The method then combines the at least one identified data asset with at least one of the one or more other data assets to form a composite data asset, wherein the composite data asset has a higher non-economic valuation score as compared to the at least one identified data asset.

In one or more illustrative embodiments, the identifying step may further comprise: obtaining a data structure representing data assets associated with the enterprise and representing lineage relationships between the data assets; identifying one or more data assets in the data structure that have economic valuation scores at or above a given threshold; pruning one or more data assets in the data structure that have economic valuation scores below the given threshold; and re-valuating the data assets of the data structure to generate updated non-economic valuation scores after the pruning step but before the combining step. The combining step may further comprise combining the at least one identified data asset with at least one of the one or more other data assets to form a composite data asset based on the updated non-economic valuation scores. In one example, the non-economic valuation score comprises a business relevance-based score.

Advantageously, in accordance with illustrative embodiments, the above-described method discovers one or more undervalued data assets and uses them to drive new, high value data assets.

These and other features and advantages of the invention will become more readily apparent from the accompanying drawings and the following detailed description.

BRIEF DESCRIPTION OF THE DRAWINGS

FIG. 1 illustrates a set of business values for data elements associated with certain business processes.

FIG. 6 illustrates a table of business values for a given set of business processes after post-pruning re-valuation, according to an illustrative embodiment.

DETAILED DESCRIPTION

Figure 2:
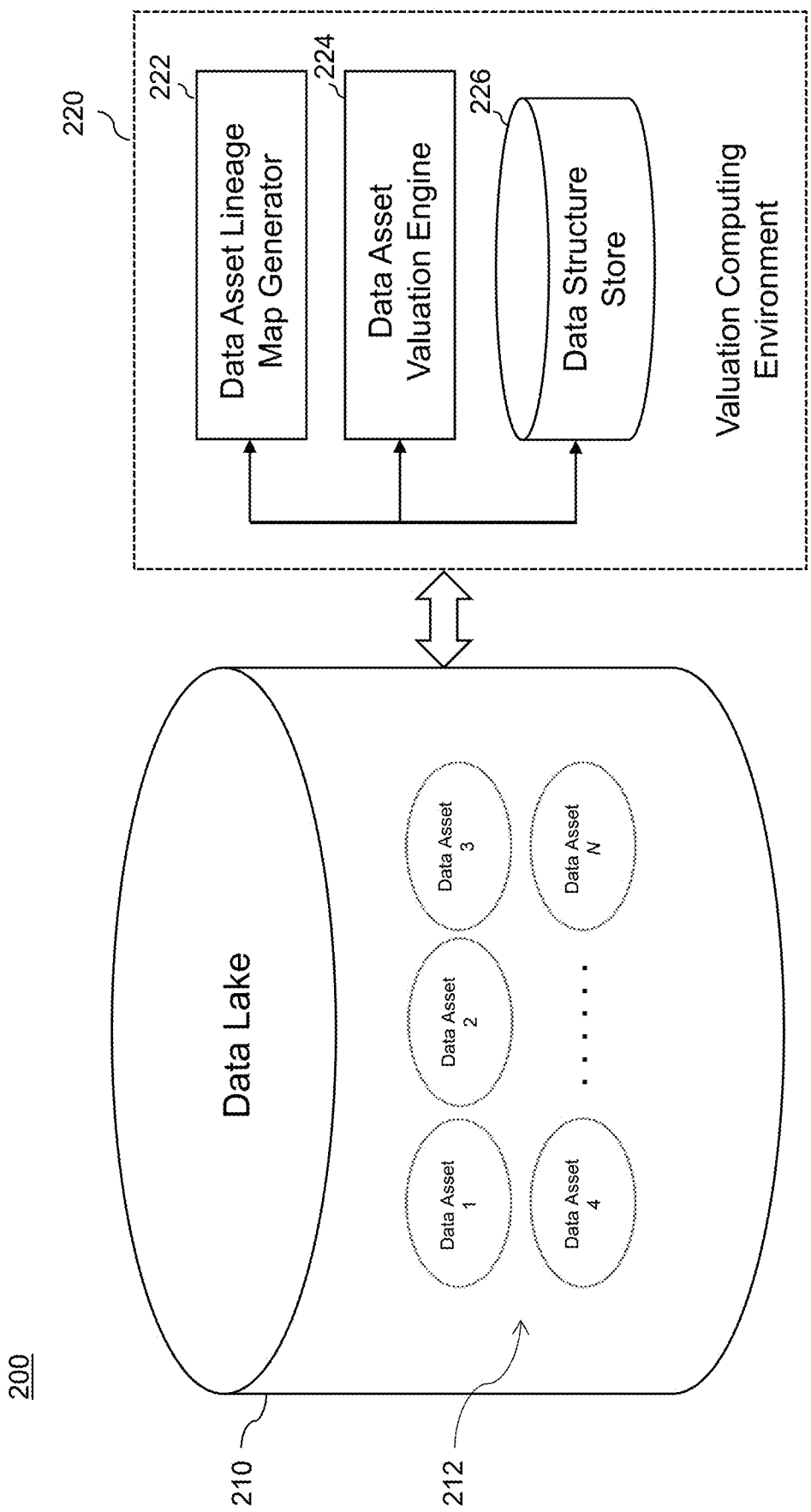
FIG. 2 illustrates a data asset valuation engine and its corresponding environment, according to an illustrative embodiment.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "information processing system," "computing environment," "computing system," "data storage system," "data lake," and the like as used herein are intended to be broadly construed, so as to encompass, for example, private and/or public cloud computing or storage systems, as well as other types of systems comprising distributed virtual infrastructure.

However, a given embodiment may more generally comprise any arrangement of one or more processing devices.

As used herein, the following terms and phrases have the following illustrative meanings:

"metadata" as used herein is intended to be broadly construed, and may comprise, for example, data that describes or defines data;

"valuation" illustratively refers to a computation and/or estimation of something's worth or value; in this case, data valuation is a computation and/or estimation of the value of a data set for a given context;

"context" illustratively refers to surroundings, circumstances, environment, background, settings, characteristics, qualities, attributes, descriptions, and/or the like, that determine, specify, and/or clarify something; in this case, for example, context is used to determine a value of data;

"node" as used herein is intended to be broadly construed, and may comprise, for example, a data structure element with which an input to an analytic process, a result of execution of an analytic process, or an output from an analytic process is associated, along with metadata if any; examples of nodes include, but are not limited to, structured database nodes, graphical nodes, and the like;

"connector" as used herein is intended to be broadly construed, and may comprise, for example, a data structure element which connects nodes in the data structure, and with which transformations or actions performed as part of the analytic process are associated, along with metadata if any; examples of connectors include, but are not limited to, arcs, pointers, links, etc.;

"data asset" as used herein is intended to be broadly construed, and may comprise, for example, one or more data items, units, elements, blocks, objects, sets, fields, and the like, combinations thereof, and otherwise any information that is obtained and/or generated by an enterprise;

"enterprise" illustratively refers to a business, a company, a venture, an entity, or the like; and "entity" illustratively refers to one or more persons, one or more systems, or combinations thereof.

As mentioned above, due at least in part to the intangible nature of data assets, enterprises have struggled to assign value to information. A variety of research initiatives have emerged to attempt to determine the value of a data asset.

By way of example, data valuation models are described in D. Laney, "The Economics of Information Assets," The Center for Infonomics, Smarter Companies presentation, September 2011. One such non-economic model includes a business value of information (BVI) model, which represents a measure of a value of the relevance and sufficiency of the data set for specific purposes. More particularly, the BVI model can be represented as follows:

$$BVI = \sum_{p=1}^{n} (RELEVANCEp) * VALIDITY * COMPLETENESS * TIMELINESS$$

One of the key metrics in the equation above is relevance, i.e., the more that a data asset is used across the enterprise, the higher its relevance score (and therefore BVI score) will be.

FIG. 1 illustrates a table 100 of BVI scores computed using the above-referenced BVI model for multiple data elements (data assets) respectively associated with multiple business processes (data sources). As shown, the BVI score for a data element associated with a customer address process is 16.96, the BVI score for a data element associated with a tax jurisdiction process is 12.30, the BVI score for a data element associated with a customer install configuration process is 6.02, and the BVI score for a data element associated with an employee training process is 0.55.

While this type of measurement (i.e., BVI score) is vital to understanding which data elements are critical (e.g., the most leveraged data element is the one associated with the customer address in table 100 given that it has the highest BVI score), it de-emphasizes other data assets that are not so highly leveraged but may have significantly more intrinsic economic value (e.g., employee training data). As a result, there may be other data assets that may indeed be critical to the enterprise but are currently undervalued and undiscovered.

Before describing the problems that arise from the above-mentioned data asset undervaluation problem, an illustrative data asset valuation engine with which one or more illustrative embodiments can be implemented will first be described, along with a data asset lineage map that can be utilized by the data asset valuation engine, in the context of FIGS. 2 and 3.

FIG. 2 illustrates a data asset valuation engine and its corresponding environment 200, according to an embodiment of the invention. As shown, environment 200 comprises a data lake 210 which itself comprises a plurality of data assets 212 (e.g., data assets 1, 2, 3, 4, . . . N). The data lake 210 is operatively coupled to a valuation computing environment 220 which comprises a data asset lineage map generator 222, a data asset valuation engine 224, and a data structure store 226, all of which are described in further detail below.

In this illustrative embodiment, it is assumed that at least a subset of the data assets 212 of the enterprise comprise data ingested into at least one data lake of the enterprise. A given such data lake in some embodiments comprises a business data lake or BDL. Thus, data lake 210 in some embodiments may be a BDL.

The term "data lake" as utilized herein is intended to be broadly construed so as to encompass, for example, a data repository that stores data for particular predetermined types of analysis or other processing. For example, a data lake can be configured to store data in a manner that facilitates flexible and efficient utilization of the stored data to support processing tasks that may be at least partially unknown or otherwise undefined at the time of data storage. This is in contrast to so-called data warehouses or data marts, which generally store data in accordance with particular predefined sets of data attributes or with predetermined data interrelationships.

Moreover, a data lake in some embodiments can provide the ability to deal with flexible combinations of a wide variety of different types of data in different analytics contexts. Examples of analytics contexts that may be supported by one or more analytics platforms in illustrative embodiments include financial services, telecommunications, health care, life sciences, manufacturing, energy, transportation, entertainment, data center security, sensor data processing and numerous others.

Data lakes in some embodiments provide the ability for the users to store different types of data in various data containers of their choosing. The data containers may be provided in multiple types, formats and storage capabilities. A given data scientist or other user may prefer to utilize one type of data container over another based on familiarity, standards, type of analytics, type of models and processing capabilities.

It is to be understood, however, that embodiments are not limited to use with data lakes.

The components of the valuation computing environment 220 are coupled to the components of the data lake 210. While components of the valuation computing environment 220 are shown separate from components of the data lake 210, it is to be appreciated that some or all of the components can be implemented together (e.g., within the data lake).

In one illustrative embodiment, the valuation computing environment 220 is configured to execute an analytic process (e.g., a data science experiment) on one or more of the plurality of data assets 212. The data asset lineage map generator 222 is configured to generate, during the course of execution of the analytic process, a data asset lineage map (i.e., data structure) comprising nodes that represent data assets (data assets 212 in data lake 210) and connectors that represent relationships between the data assets. It is to be understood that at least a portion of the data assets in the data asset lineage map represent results and/or attributes associated with execution of the analytic process. An example of a data asset lineage map is shown and will be described further below in the context of FIG. 3. The data asset lineage maps that are generated by the data asset lineage map generator 222 are stored in the data structure store 226.

One non-limiting example of a methodology for generating a data asset lineage map is described in U.S. Ser. No. 15/381,251, filed on Dec. 16, 2016 and entitled "Economic Valuation of Data Assets," the disclosure of which is incorporated by reference herein in its entirety.

As further shown in the valuation computing environment 220 of FIG. 2, the data asset valuation engine 224 is operatively coupled to the data asset lineage map generator 222. While illustratively shown as separate components in FIG. 2, it is to be understood that the functions of components 222 and 224 may be combined within a single component. The data asset valuation engine 224 identifies one or more data assets (from data assets 212 in data lake 210) which, in one embodiment, are represented in the form of a data asset lineage map generated by the data asset lineage map generator 222. The data asset valuation engine 224 calculates at least one value for each of the one or more data assets based on a given data valuation algorithm, in one example, the above-referenced BVI model. These calculated values for the one or more data assets are stored in one or more valuation tables, e.g., table 100 in FIG. 1. The valuation tables that are generated by the data asset valuation engine 224 are stored in the data structure store 226. These steps will be further explained below.

Figure 3:
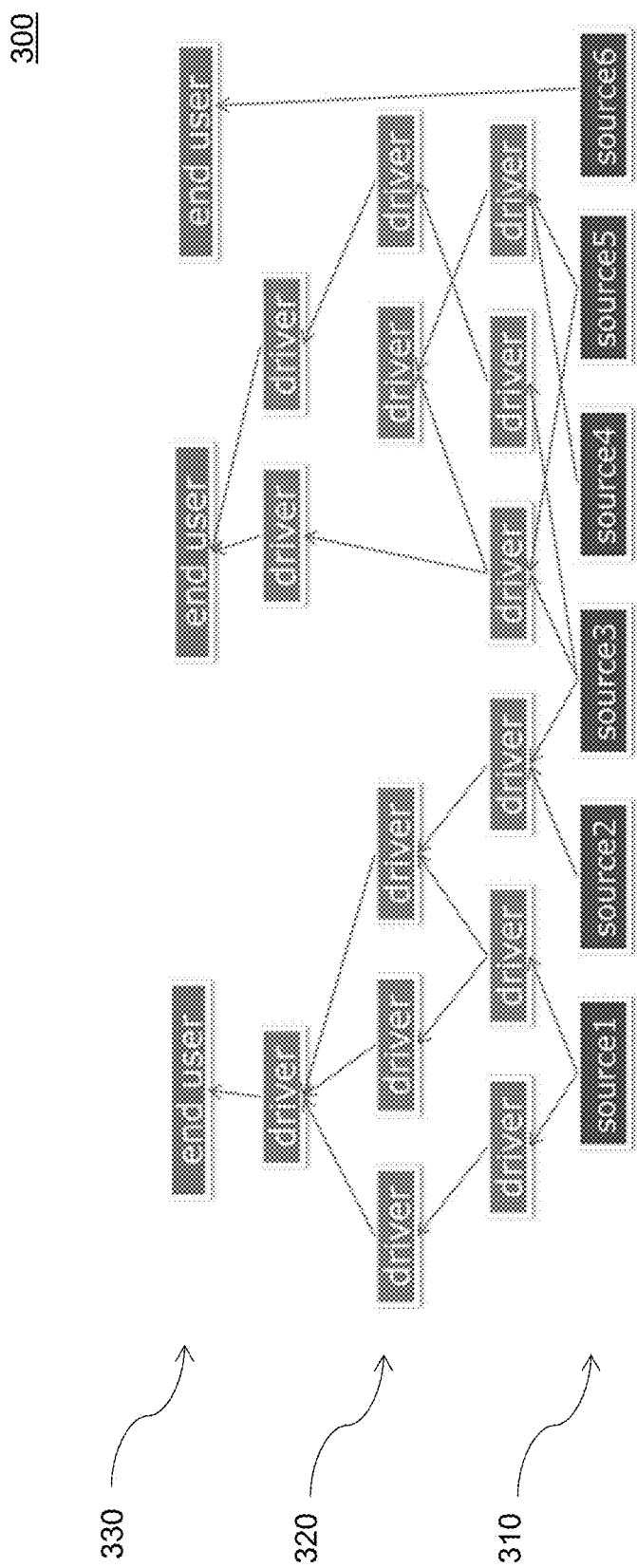
FIG. 3 illustrates a data asset lineage map, according to an illustrative embodiment.

FIG. 3 illustrates a data asset lineage map, according to an embodiment of the invention. The map 300 shown in FIG. 3 is generated by the data asset lineage map generator 222. As shown, data asset lineage map 300 comprises multiple nodes connected by multiple connectors. The nodes and connectors can each store metadata. The nodes represent data assets 212 and the connectors represent relationships between the data assets 212. Nodes, in this example, comprise a set of source nodes 310, a set of intermediate (driver) nodes 320, and a set of top-level (or end user) nodes 330.

More particularly, data asset lineage map 300 illustrates a hierarchical data structure that comprises six data assets located in the bottom row and collectively labeled "source" asset nodes 310 (source1, source2, source3, source4, source5, and source6). One or more data scientists can explore this source data, perform analytics, and generate intermediate data sets collectively labeled as driver nodes 320. Then, results and recommendations can be generated for the enterprise collectively labeled as end user nodes 330. In some cases (source6), an end user node can be connected directly to a source node without having an intermediate driver node therebetween. By tracking the lineage from the sources up to the end user nodes, an enterprise can obtain significant insight into how its data assets are related by generating and utilizing such data asset lineage maps.

Figure 4:
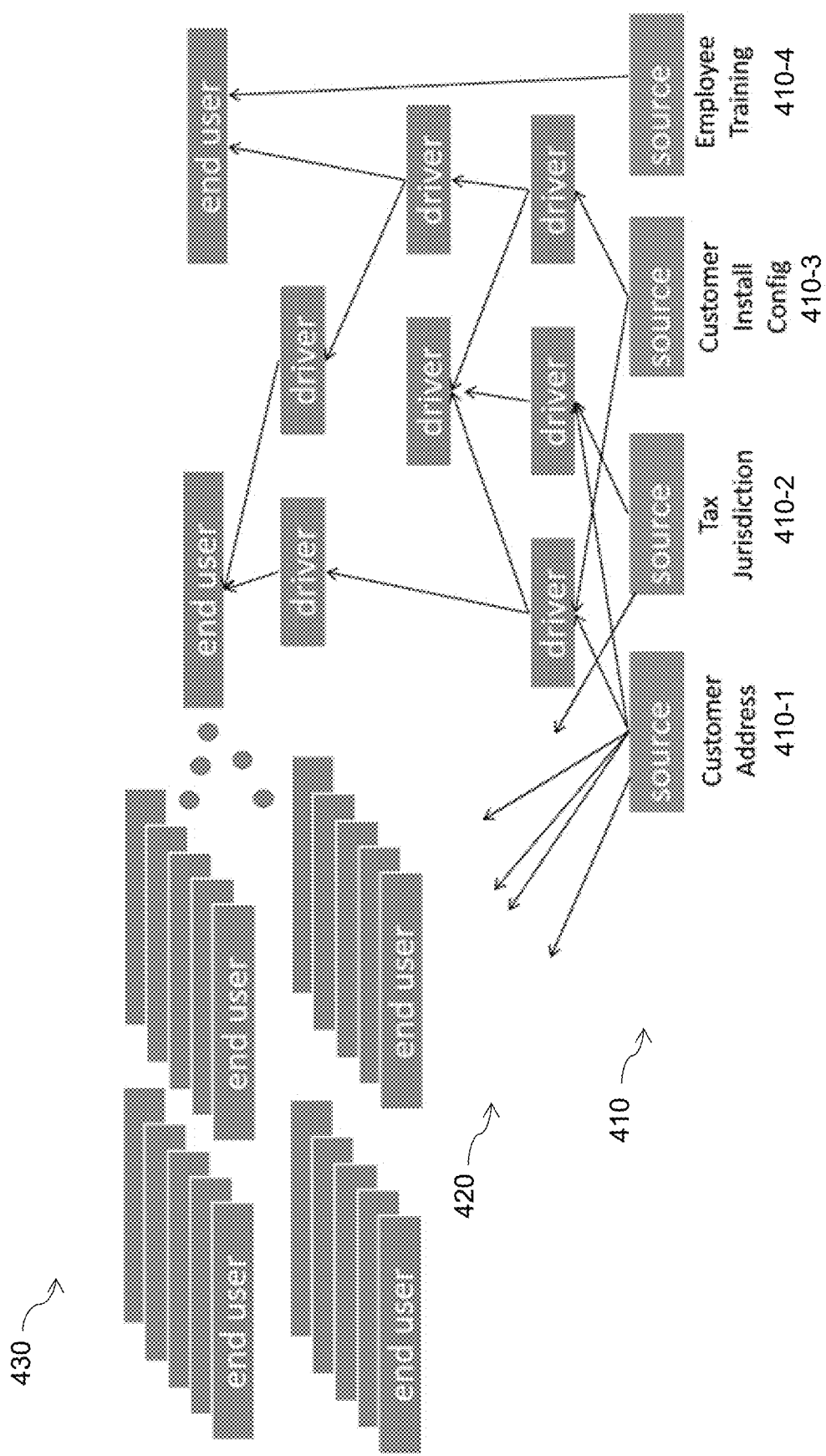
FIG. 4 illustrates a data asset lineage map with a given set of business processes as data sources, according to an illustrative embodiment.

Referring now to FIG. 4, a data asset lineage map 400 will be used to illustrate the above-referenced undervaluation problem. As shown, source nodes 410 include data assets associated with the business processes mentioned above with respect to FIG. 1, i.e., a customer address data asset 410-1, a tax jurisdiction data asset 410-2, a customer install configuration data asset 410-3, and an employee training data asset 410-4. Similar to map 300 in FIG. 3, map 400 also shows intermediate driver nodes 420 and end user nodes 430 representing data assets derived from lower nodes (data assets) in the hierarchical data structure.

In order to calculate BVI, a data asset lineage map such as map 400 can be used to identify source data assets and how they are being used by different business processes and/or analytics to generate intermediate (driver) assets, which in turn are used to supply insight to end users (e.g. business units or customers). More particularly, FIG. 4 shows the above-mentioned four source data assets 410-1, 410-2, 410-3, and 410-4 and how they are consumed in order to produce driver data assets 420 and end user data assets 430 to support relevant business processes. As is evident, the customer address data asset 410-1 is heavily leveraged by many end user and driver assets (see left side of map 400) while the employee training data asset 410-4 is less leveraged (see right side of map 400).

FIG. 4 at least partially explains why, in table 100 of FIG. 1, customer address has a BVI of 16.96 while employee training is only 0.55. It can be understood that this low-value BVI number for the employee training data asset is based on the fact that employee training is currently only used by a human resource (HR) business process (e.g., end user node in the upper right-hand corner of map 400) with just a 10% relevance because it is only used to track individual development plans. However, the customer address data asset has a much higher BVI because it is much more relevant to more business processes (e.g., multiple end user nodes in the upper left-hand corner of map 400).

Such a valuation approach has many disadvantages, examples of which are as follows.

BVI is not Tied to Financial Value

While the customer address data asset is more heavily leveraged in the example of FIG. 4, it does not reflect whether or not the data asset significantly contributes to the enterprise's economic bottom line, and if it does, then by how much.

Skewed Data Management of High-BVI Items

Data assets with a high BVI score may be targeted for additional data curation investment (e.g., improving the data's quality). This is important (because the data is so heavily leveraged) but also draws resources away from other (undiscovered) data elements that may also need attention and could produce higher returns.

No Methods for Identifying Undervalued Data Assets In the example above, it may bring a significant benefit to more heavily leverage a salesperson's education or training knowledge (the employee training data asset 410-4 in FIG. 4), yet its low leverage by the business may cause it to be passed over by data wrangling and/or data quality investments.

Undiscovered/Uncreated "Composite" High Value Assets

Given that data assets such as employee training data remain undervalued, it follows that the enterprise may be missing an opportunity to create an extremely high-value, new data asset by combining undervalued assets with data that is already known to be high-value. In illustrative embodiments, these new data assets can be thought of as "composite" assets, which may have a much higher BVI than even the data assets individually.

Figure 5:
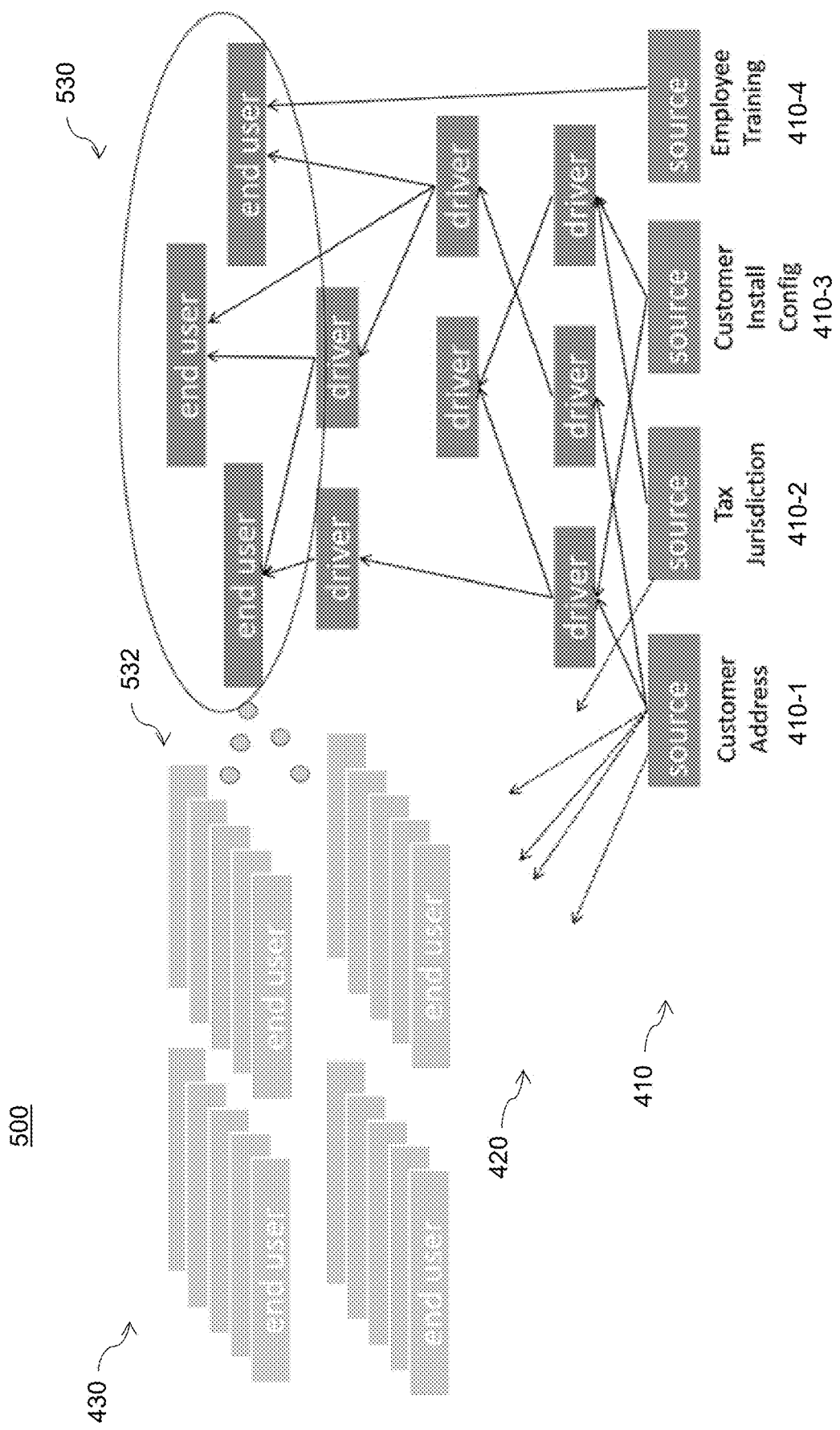
FIG. 5 illustrates a pruning process for identifying undervalued data assets in a data asset lineage map, according to an illustrative embodiment.

Illustrative embodiments overcome the above and other challenges by discovering undervalued data assets and using them to drive new, high value data assets. FIG. 5 highlights such an approach.

More particularly, FIG. 5 illustrates a pruning process 500 for identifying undervalued data assets in the data asset lineage map 400 of FIG. 4, according to an illustrative embodiment. As shown, the highest value business insights (e.g., end user reports 530) have been circled. Locating high value business insights occurs, in accordance with illustrative embodiments, as described below. The high value business insights can be used to locate undervalued data assets and create new, high value composite assets, as will also be further described below.

Identifying High Value Business Insights

The data asset lineage map depicted in FIG. 5 results in a large number of end user assets that are consumed by the enterprise and used to create value for the organization. The economic value of these data assets can be calculated using a variety of techniques including, but not limited to: mapping the data asset's contribution to a line of business revenue as described in the above-referenced U.S. Ser. No. 15/381,251; mapping the data asset's impact per event as described in U.S. Ser. No. 15/484,270, filed on Apr. 11, 2017 and entitled "Data Governance with Automated Risk Valuation Via Impact Per Event Analytics," the disclosure of which is incorporated by reference herein in its entirety; and/or an economic value of information (EVI) model described in the above-referenced Laney reference.

Regardless of how the economic or financial value of these top-level end user assets is calculated, the enterprise can calculate the "top N" (e.g., three as shown in 530 of FIG. 5) data assets that the organization is producing to drive existing business processes and, in some cases, to find new business opportunities.

Pruning Based on Financial Value

Once a set of high-value assets have been identified (e.g., top three in 530 of FIG. 5 or, more particularly, having economic scores at or above a given threshold score), the rest of the end user assets in the map can be pruned. This step is depicted in FIG. 5 as the faded assets 532 (more particularly, prune assets having economic scores below the given threshold score). This results in much lower relevance-scores (i.e., lower non-economic scores) for certain data assets, as will be described below.

Post-Pruning Re-Valuation

Once pruning of lower value items has taken place, the data assets can be re-valuated based on the new (pruned) map. Given that there are much fewer end user assets consuming data assets such as customer address, the BVI scores will significantly change as illustrated in table 600 of FIG. 6. As shown in table 600 (as compared with table 100 in FIG. 1), the BVI score for the data element associated with the customer address process is now 0.91, the BVI score for the data element associated with the tax jurisdiction process is now 0.4, the BVI score for the data element associated with the customer install configuration process is 0.3, while the BVI score for the data element associated with the employee training process remains at 0.55. Note that the employee training BVI score remains the same because it is only consumed by a high value business process.

Identification of Undervalued Assets

Given that multiple scores (e.g., customer address, tax jurisdiction) dropped significantly by using the pruning technique, the employee training data asset rose higher to the top to identify itself as a potentially underleveraged (i.e., undervalued) asset. This allows an enterprise to conclude that the employee training data asset deserves a further look as a potentially undervalued asset. It is not nearly as valuable to the business from a relevance (BVI) standpoint but it becomes more significant when the focus is shifted to economic value. It should also be noted that the employee training data asset score did not drop (it dropped zero percent), while the customer address data asset dropped almost 95%, and others also dropped significantly. Thus, it is to be appreciated that data assets that are low-scoring yet hold their value after pruning are potentially undervalued as well.

Increasing BVI for Undervalued Assets

Once a data asset (e.g., employee training) has been identified as undervalued, the enterprise can go to work and begin a data exploration phase for the asset. By way of example, this may involve multiple business units using the asset in new ways, creating new analytic sandboxes, and writing new valuation models. An analytic sandbox as used herein is intended to be broadly construed, and may comprise, for example, at least a part of an analytic computing environment (including specifically allocated processing and storage resources) in which one or more analytic processes are executed on one or more data sets. For example, the analytic process can be part of a data science experiment and can be under the control of a data scientist, an analytic system, or some combination thereof. As the above-mentioned data exploration phase occurs, the relevance score of the data rises, as do other important BVI metrics (e.g. quality, completeness, etc.).

Creating and Valuing New Composite Data Assets

In cases where an undervalued data asset is found to be used in conjunction with one or more other data assets, as a source for a business insight with high value, a new composite data asset can be defined, in accordance with illustrative embodiments, which will have a much higher BVI score.

Figure 7:
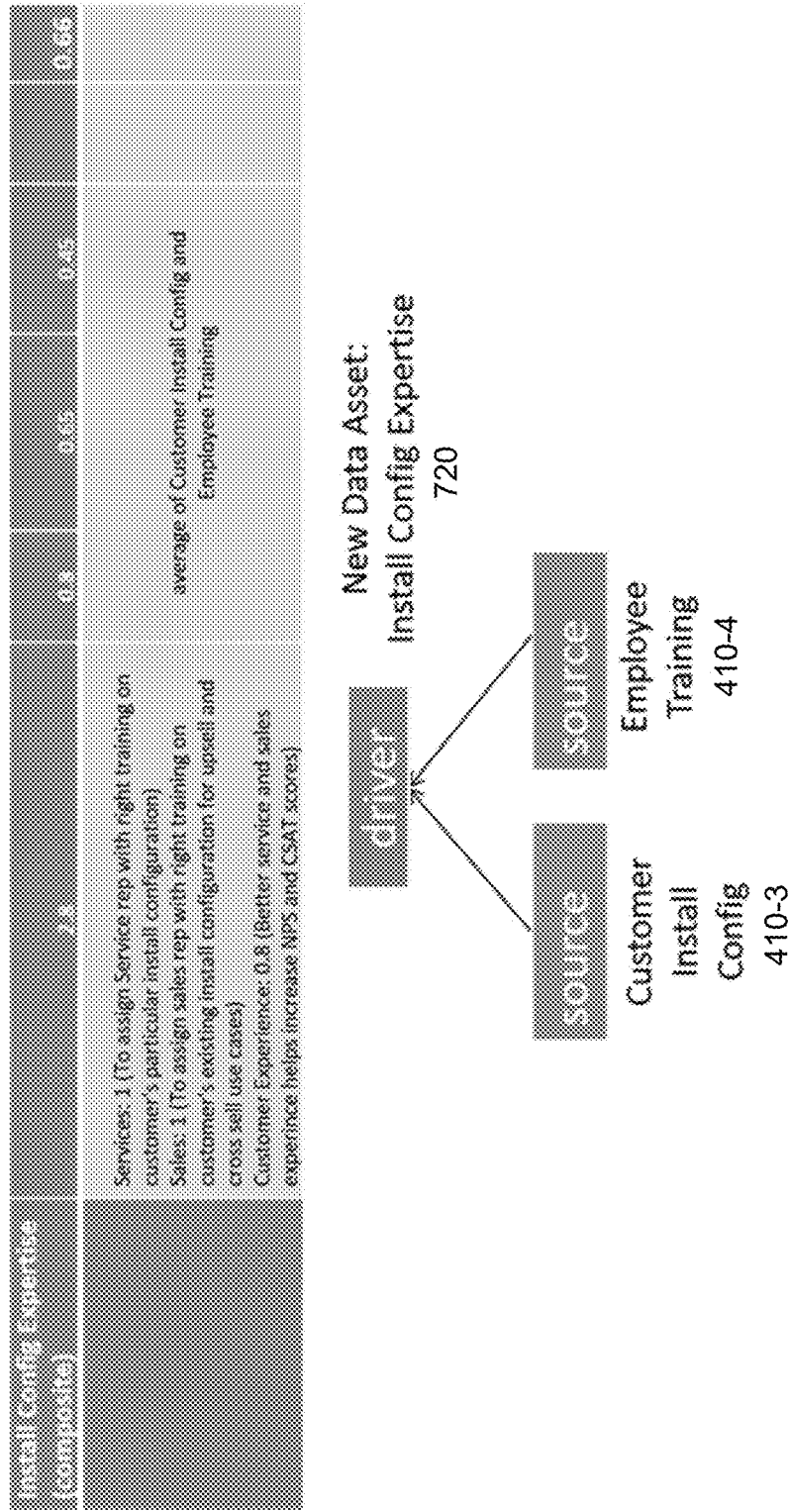
FIG. 7 illustrates a process for creating and valuing a new composite data asset, according to an illustrative embodiment.

FIG. 7 illustrates a process 700 for creating and valuing a new composite data asset, according to an illustrative embodiment. In the process 700, it is assumed that customer install configuration data asset 410-3 from FIGS. 4 and 5 (higher value data asset) can be combined with employee training data asset 410-4 (undervalued data asset) to create a composite data asset 720 called install configuration (config) expertise (training of an employee on specific customer install configurations).

Creating this new asset enables new business processes with corporate benefits, and it also results in a new BVI of 0.66 for install config expertise compared to just 0.55 for the employee training data asset individually. Process 700 shows the creation of this new composite data asset and the calculations that lead to its new BVI. More particularly, a sub-score of 2.8 is assigned to the services, sales, and customer experience attributes (note that NPS refers to Net Promotor Score and CSAT refers to a Customer Satisfaction score) associated with the new composite data asset. Further, sub-scores of 0.8, 0.65 and 0.45 represent the average of customer install configuration and employee training data assets. The result is a new BVI score for the new composite data asset 720 of 0.66.

Note that the above-described high-value data asset identification, map pruning, post-pruning re-valuation, undervalued data asset identification, creating and valuing new composite data assets, and other related steps can be performed by the components of the valuation computing environment 220 in FIG. 2.

Figure 8:
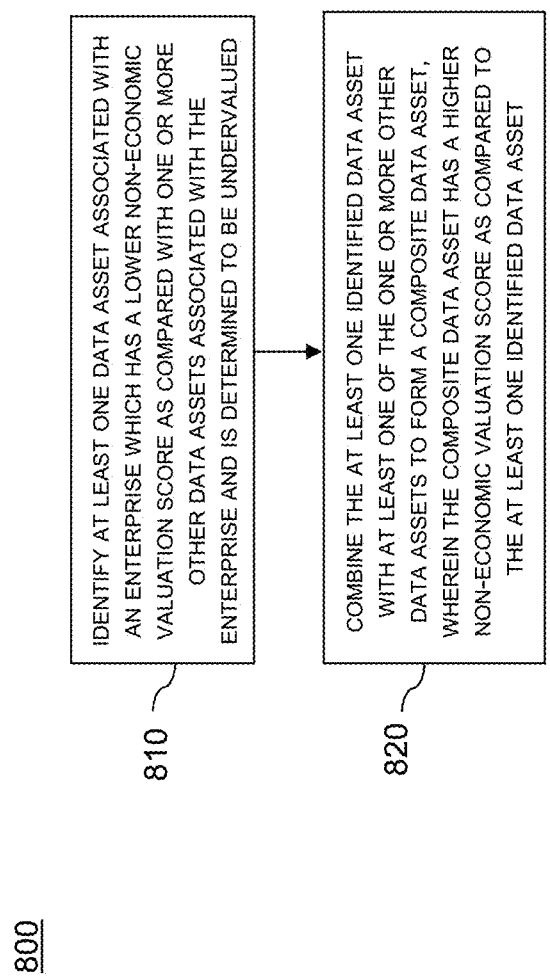
FIG. 8 illustrates a methodology for creating high value data assets from undervalued data, according to an illustrative embodiment.

FIG. 8 illustrates a methodology for creating high value data assets from undervalued data, according to an illustrative embodiment. As shown in methodology 800, step 810 identifies at least one data asset associated with an enterprise which has a lower non-economic valuation score as compared with one or more other data assets associated with the enterprise and is determined to be undervalued. In one or more illustrative embodiments, the term undervalued refers to a data asset that is considered less valuable than it actually is or potentially could be (e.g., the above-described employee training data asset). In one example, such an undervalued data asset could have a higher economic valuation as compared with the other data assets. However, in an alternative example, the undervalued asset may still have a lower economic valuation than at least some of the other data assets. Step 820 then combines the at least one identified data asset with at least one of the one or more other data assets to form a composite data asset, wherein the composite data asset has a higher non-economic valuation score as compared to the at least one identified data asset.

At least portions of the valuation computing environment shown in FIGS. 1-8 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the valuation computing environment shown in FIGS. 1-8 may each run on a computer, server, storage device or other processing platform element. A given such element may be viewed as an example of what is more generally referred to herein as a "processing device." An example of such a processing platform is processing platform 900 shown in FIG. 9.

The processing platform 900 in this embodiment comprises a plurality of processing devices, denoted 902-1, 902-2, 902-3, . . . 902-N, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 9:
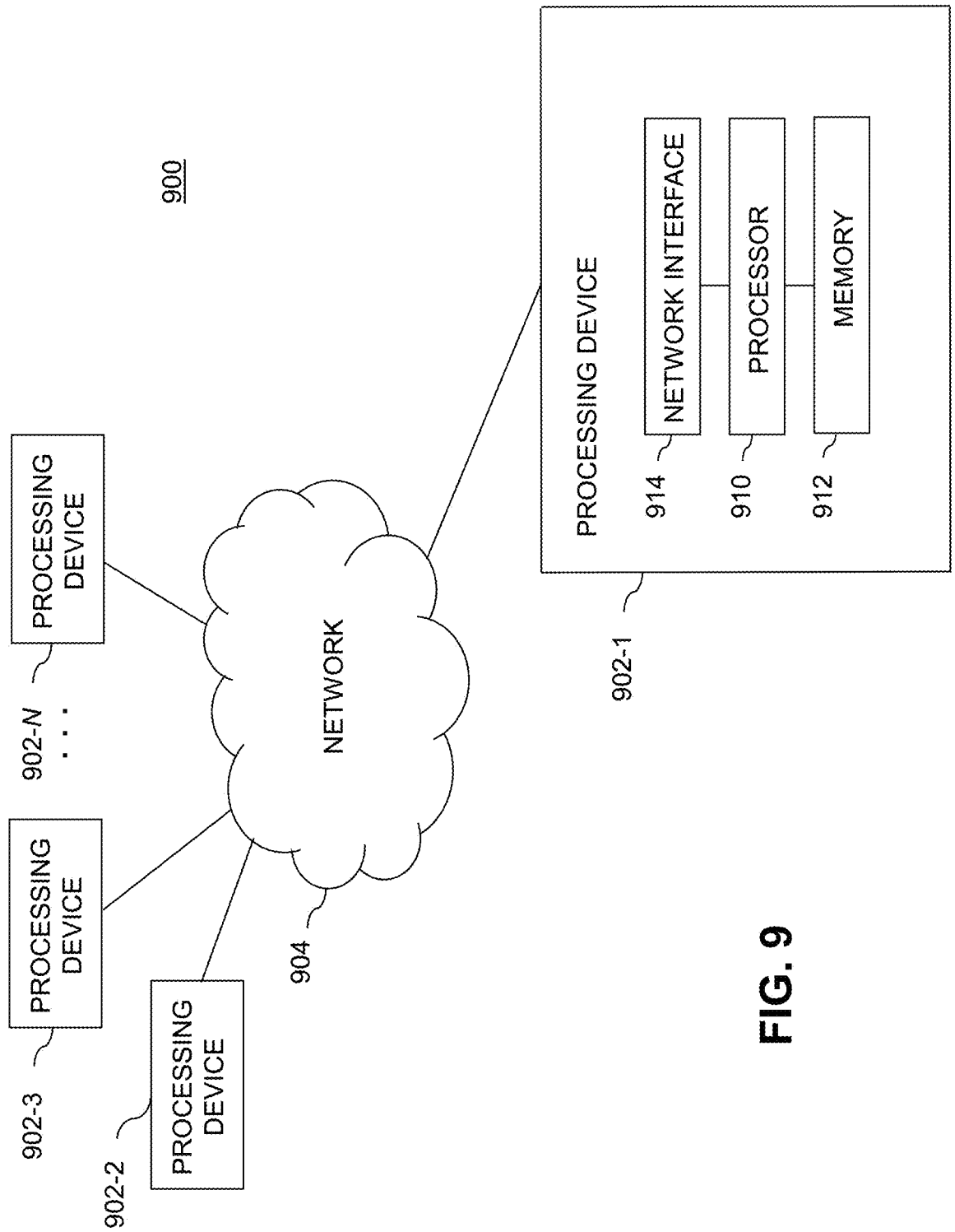
FIG. 9 illustrates a processing platform used to implement a data asset valuation engine and its corresponding environment, according to an illustrative embodiment.

Also included in the processing device 902-1 of the example embodiment of FIG. 9 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a valuation computing environment of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system and methods described herein. Such components can communicate with other elements of the system over any type of network or other communication media.

As indicated previously, in some embodiments, components of the valuation computing environment as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems and assets. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method, comprising:
   obtaining, by at least one processing device comprising a processor and a memory, a data asset lineage map comprising a plurality of nodes each associated with a data asset of an enterprise and connectors that represent relationships between the data assets, the data asset lineage map being a hierarchical data structure comprising (i) a set of top-level nodes, (ii) a set of intermediate level nodes and (iii) a set of bottom-level nodes, wherein each data asset associated with a node of the set of top-level nodes, the set of intermediate level nodes and the set of bottom-level nodes having a non-economic valuation score;
   identifying, by the at least one processing device, at least one data asset associated with a node of the set of top-level nodes which has a non-economic valuation score below a given threshold score;
   removing, by the at least one processing device, the at least one identified data asset from the set of top-level nodes;
   re-evaluating, by the at least one processing device, the non-economic valuation score for the data assets associated with (i) the remaining nodes of the set of top-level nodes, (ii) the set of intermediate level nodes and (iii) the set of bottom-level nodes to generate updated non-economic valuation scores;
   identifying, by the at least one processing device, based on the re-evaluating step, at least another data asset which has a lower updated non-economic valuation score as compared with one or more other data assets and is determined to be undervalued; and
   combining, by the at least one processing device, the at least another identified data asset with at least one of the one or more other data assets to form a composite data asset, wherein the composite data asset has a higher non-economic valuation score as compared to the at least another identified data asset based on the updated non-economic valuation scores.

2. The method of claim 1, wherein the identifying at least another data asset associated with a node of the set of top-level nodes which has a non-economic valuation score below a given threshold score further comprises identifying one or more data assets that have updated economic valuation scores at or above a given threshold.

3. The method of claim 1, wherein the non-economic valuation score comprises a business relevance-based score.

4. A system comprising:
   one or more processors operatively coupled to one or more memories configured to:
   obtain a data asset lineage map comprising a plurality of nodes each associated with a data asset of an enterprise and connectors that represent relationships between the data assets, the data asset lineage map being a hierarchical data structure comprising (i) a set of top-level nodes, (ii) a set of intermediate level nodes and (iii) a set of bottom-level nodes, wherein each data asset associated with a node of the set of top-level nodes, the set of intermediate level nodes and the set of bottom-level nodes having a non-economic valuation score;
   identify at least one data asset associated with a node of the set of top-level nodes which has a non-economic valuation score below a given threshold score;
   remove the at least one identified data asset associated with a node from the set of top-level nodes;
   re-evaluate the non-economic valuation score for the data assets associated with (i) the remaining nodes of the set of top-level nodes, (ii) the set of intermediate level nodes and (iii) the set of bottom-level nodes to generate updated non-economic valuation scores;
   identify, based on the re-evaluating, at least another data asset which has a lower updated non-economic valuation score as compared with one or more other data assets and is determined to be undervalued; and
   combining the at least another identified data asset with at least one of the one or more other data assets to form a composite data asset, wherein the composite data asset has a higher non-economic valuation score as compared to the at least another identified data asset based on the updated non-economic valuation scores.

5. The system of claim 4, wherein the identifying at least another data asset associated with a node of the set of top-level nodes which has a non-economic valuation score below a given threshold score further comprises identifying one or more data assets that have updated economic valuation scores at or above a given threshold.

6. The system of claim 4, wherein the non-economic valuation score comprises a business relevance-based score.

7. An article of manufacture comprising a processor-readable storage medium having encoded therein executable code of one or more software programs, wherein the one or more software programs when executed by one or more processing devices implement the steps of:
   obtaining a data asset lineage map comprising a plurality of nodes each associated with a data asset of an enterprise and connectors that represent relationships between the data assets, the data asset lineage map being a hierarchical data structure comprising (i) a set of top-level nodes, (ii) a set of intermediate level nodes and (iii) a set of bottom-level nodes, wherein each data asset associated with a node of the set of top-level nodes, the set of intermediate level nodes and the set of bottom-level nodes having a non-economic valuation score;

identifying at least one data asset associated with a node of the set of top-level nodes which has a non-economic valuation score below a given threshold score;

removing the at least one identified data asset from the set of top-level nodes;

re-evaluating the non-economic valuation score for the data assets associated with (i) the remaining nodes of the set of top-level nodes, (ii) the set of intermediate level nodes and (iii) the set of bottom-level nodes to generate updated non-economic valuation scores;

identifying, based on the re-evaluating step, at least another data asset which has a lower updated non-economic valuation score as compared with one or more other data assets and is determined to be undervalued; and combining the at least another identified data asset with at least one of the one or more other data assets to form a composite data asset, wherein the composite data asset has a higher non-economic valuation score as compared to the at least another identified data asset based on the updated non-economic valuation scores.

8. The article of claim 7, wherein the non-economic valuation score comprises a business relevance-based score.

9. The article of claim 7, wherein the identifying at least another data asset associated with a node of the set of top-level nodes which has a non-economic valuation score below a given threshold score further comprises identifying one or more data assets that have updated economic valuation scores at or above a given threshold.

10. The article of claim 7, wherein the nodes and connectors each store metadata.

11. The article of claim 7, wherein at least one node of the set of bottom-level nodes is connected to at least one node of the set of top-level nodes.

12. The article of claim 7, wherein at least one node of the set of bottom-level nodes is connected to at least one node of the set of intermediate level nodes.

13. The article of claim 7, wherein at least one node of the set of bottom-level nodes is connected to at least one node of the set of intermediate level nodes which is connected to at least one node of the set of top-level nodes.

14. The system of claim 4, wherein the nodes and connectors each store metadata.

15. The system of claim 4, wherein at least one node of the set of bottom-level nodes is connected to at least one node of the set of top-level nodes.

16. The system of claim 4, wherein at least one node of the set of bottom-level nodes is connected to at least one node of the set of intermediate level nodes.

17. The system of claim 4, wherein at least one node of the set of bottom-level nodes is connected to at least one node of the set of intermediate level nodes which is connected to at least one node of the set of top-level nodes.

18. The method of claim 1, wherein at least one node of the set of bottom-level nodes is connected to at least one node of the set of top-level nodes.

19. The method of claim 1, wherein at least one node of the set of bottom-level nodes is connected to at least one node of the set of intermediate level nodes.

20. The method of claim 1, wherein at least one node of the set of bottom-level nodes is connected to at least one node of the set of intermediate level nodes which is connected to at least one node of the set of top-level nodes.

* * * * *